United States Patent

[11] 3,618,061

[72] Inventor Joseph A. Livers
 Roseville, Mich.
[21] Appl. No. 820,493
[22] Filed Apr. 30, 1969
[45] Patented Nov. 2, 1971
[73] Assignee Eaton Yale & Towne Inc.
 Cleveland, Ohio

[54] MONITORING APPARATUS FOR MONITORING THE DENSITY OF A MATERIAL CARRIED BY A FLUID AND THE FLOW OF THE FLUID
18 Claims, 4 Drawing Figs.

[52] U.S. Cl. .................................................. 340/236,
 73/204, 250/218, 340/239, 356/103, 356/208
[51] Int. Cl. ........................................................ G08b 19/00
[50] Field of Search............................................ 340/236,
 239, 243; 73/204; 356/102, 103, 104, 207, 208;
 250/218

[56] References Cited
UNITED STATES PATENTS
2,791,932 5/1957 Hall ............................. 356/207 X
3,358,148 12/1967 Conklin et al. ................ 356/104
3,366,942 1/1968 Deane .......................... 340/243
3,510,666 5/1970 Topol .......................... 356/208 X
3,518,437 6/1970 Riggs .......................... 356/207 X Primary Examiner—John W. Caldwell
Assistant Examiner—Daniel Myer
Attorney—Yount & Tarolli ABSTRACT: An improved monitoring apparatus for sensing the density of a material carried by a fluid in a conduit and the flow of the fluid to activate a warning device when the density of the material or flow of the fluid drops below a predetermined level. Such an improved monitoring apparatus includes means for sensing the density of the material carried by said fluid and is adapted to provide a signal proportional to the density to a circuit means and means for sensing the flow of the fluid for providing a signal dependent on the flow to the circuit means. The circuit means is adapted to receive these signals and is operable to activate the warning device when either signal drops below a predetermined level. The means for sensing provides light to the conduit, a first sensor means for detecting the light intensity and a second sensor for sensing the amount of light reflected by the material.

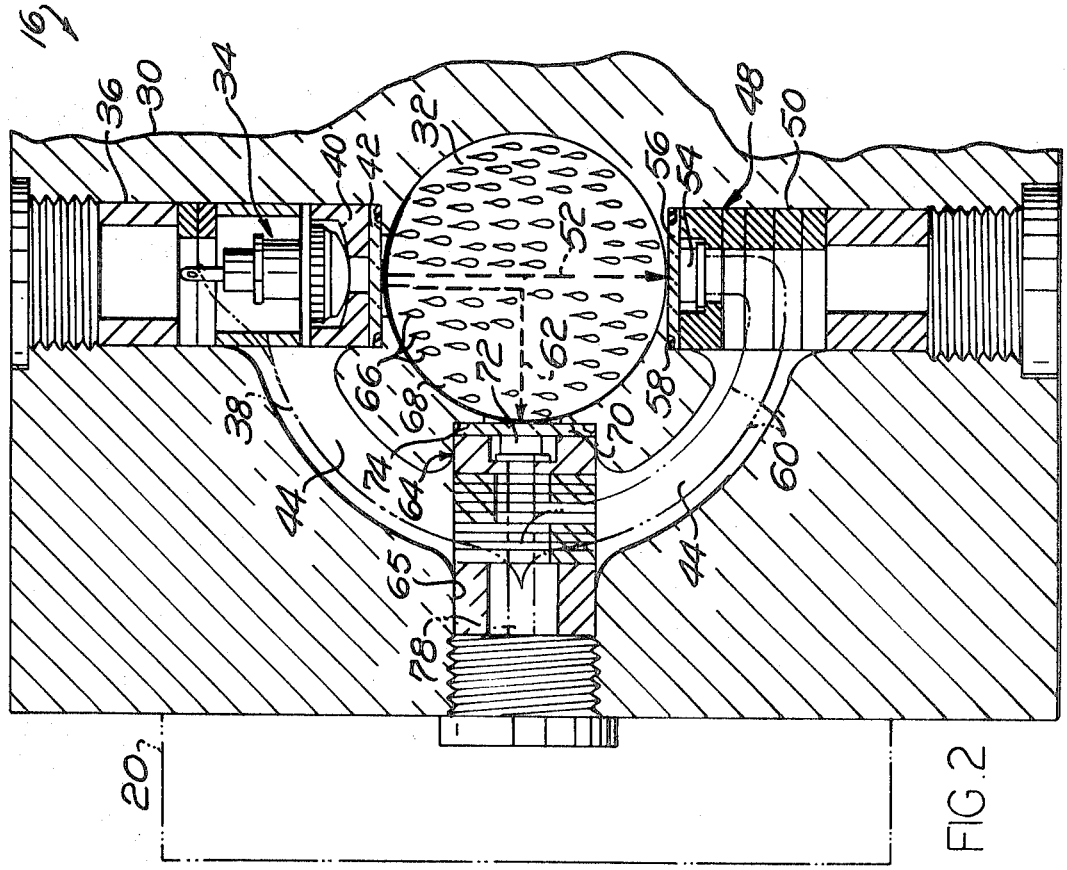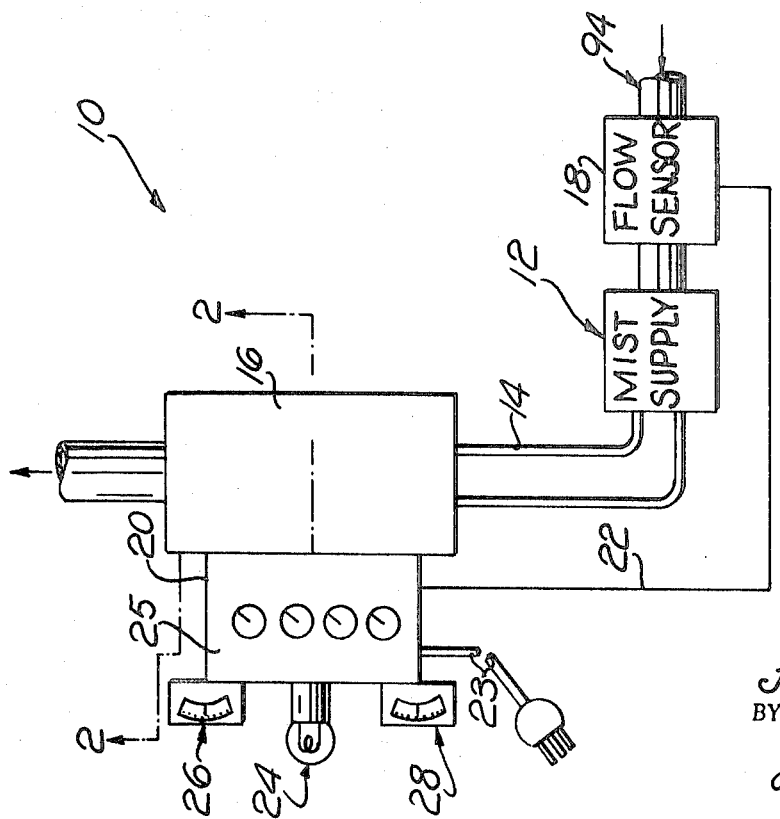

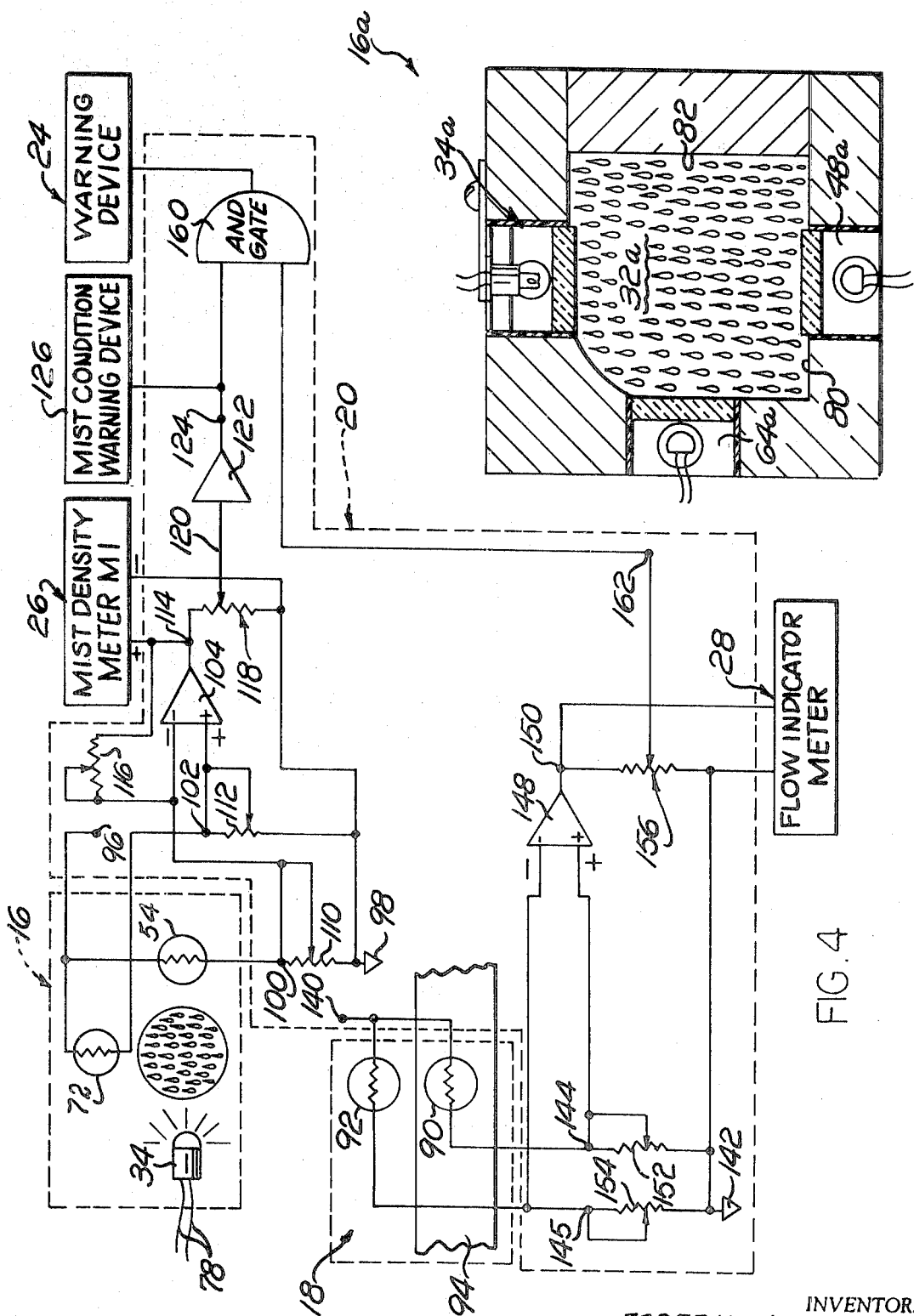

MONITORING APPARATUS FOR MONITORING THE DENSITY OF A MATERIAL CARRIED BY A FLUID AND THE FLOW OF THE FLUID

The present invention relates to a monitoring apparatus which activates a warning device when the flow of a fluid in a conduit or the density of a material carried by the fluid drops below a predetermined level, and more particularly to such a monitoring apparatus which includes a density sensor which detects the amount of material carried by the fluid by measuring the amount of light reflected by the material carried by the fluid.

Many various bearing surfaces require some type of constant lubrication. Typically, such lubrication is supplied by an oil-misting device. These oil-misting devices provide a material such as a lubricant oil in suspension in a fluid such as air and provide for flow of the material carried by the fluid to the bearing. It is apparent from such an example that the amount of the oil carried by the air must be sensed to assure proper lubrication of the bearings and on the other hand, the flow of the fluid must be sensed to assure continuous lubrication of the bearings.

Monitoring apparatuses for monitoring the density of the material carried by the fluid are known. These prior art devices are subject to various system fluctuations and do not provide for proper compensation for these variables. In addition, these prior art devices do not provide for sensing the flow of the fluid to assure that the bearing will be continuously lubricated.

The monitoring apparatus of the present invention provides a warning signal if either the density of the material carried by the fluid or the flow of the fluid drops below a predetermined level. In order to provide an accurate measurement of the density, the density of the material is sensed by the amount of light reflected by the material. The two sensors are provided such that intensity variations of the light source are compensated and the difference in the signals created by these sensors provides measurement of the density. In addition such a differential measurement increases the range of this differential signal and thus has increased accuracy.

The present invention also provides a density indicator which gives a visible indication of the amount of the density and a flow indicator which gives a visible indication of the flow of the fluid at any give time. Thus, when a warning device is activated, the area of difficulty may be readily determined.

Accordingly, it is an object of this invention to provide a monitoring apparatus which senses the density of a material carried in a fluid and the flow of the fluid to actuate a warning device when the density or the flow drop below a predetermined level.

It is yet another object in the present invention to provide a monitoring apparatus which senses the density of a material carried in a fluid by sensing the amount of light reflected by the material.

It is yet another object of the present invention to provide a sensor to detect the density of a material carried in a fluid by sensing the amount of light reflected by the material.

It is yet another object in the present invention to provide a light source whose intensity is detected by a first sensor and the amount of light reflected by the material carried by the fluid detected by a second sensor wherein each of the sensors provide a circuit means with a signal wherein the signal from the second sensor when reduced by the signal from the first sensor is proportional to the density and a flow-sensing means which detects the flow of the fluid and provides the circuit means with a signal thereof wherein the circuit means is adapted to actuate a warning device when the density of the material carried by the fluid or the flow of the fluid drops below a predetermined level.

Yet another object of the present invention is to provide a monitoring apparatus having a density meter to give a visible indication of the density of the material carried by the fluid.

A further object of the present invention is to provide a monitoring apparatus having a flow indicator to provide a visible indication of the flow of the fluid.

Still further objects, advantages, and features of the present invention will be apparent to those skilled in the art to which it relates from the following detailed description made with reference to the accompanying drawings forming a part of the specification and in which:

FIG. 1 is a schematic illustration of a mist supply and a monitoring apparatus of the present invention;

FIG. 2 is a cross-sectional view of the density sensor taken along lines 2—2 of FIG. 1;

FIG. 3 is a cross-sectional view similar to FIG. 2 of a second embodiment of a density sensor; and FIG. 4 is a schematic diagram showing the circuitry of the present invention.

The present invention provides a monitoring apparatus to give a warning signal when either the density of a material carried by a fluid or the flow of the fluid drop below a predetermined level. A monitoring apparatus of the present invention includes a density sensor which determines the density of the material be sensing the amount of light reflected thereby and compensates for the intensity of the light source.

FIG. 1 shows a representative monitoring system 10 having a mist supply 12 adapted to provide an oil mist. The oil material is suspended in a fluid, such as air and passes through the conduit 14 to the device to be lubricated such as bearings. If there is an insufficient amount of oil suspended in the air or an insufficient flow of the oil mist to the bearings, the bearings will not receive proper lubrication and will thus rapidly deteriorate.

In order to prevent such a problem, the monitoring apparatus 10 of the immediate invention is connected with the mist supply 12. The monitoring apparatus 10 includes a density sensor 16 interposed between the mist supply 12 and the bearings and a flow sensor 18 connected to the mist supply 12. The density sensor 16 is electrically connected to a circuit means 20 to provide the circuit means 20 with signals, the difference of which is proportional to the density of the mist flowing in the conduit 14, as will be described below. The flow sensor 18 is connected by lines 22 to the circuit means 20 to provide the circuit means 20 with a signal dependent on the flow of the air entering the mist supply 12. Electrical power is supplied through line 23 to the circuit means in order to power the monitoring apparatus as well known by those skilled in the art.

The circuit means 20 provides a warning device 24 with a signal to alert an operator when the density of the mist or the flow of the mist drops below a predetermined level as sensed by the density sensor 16 and the flow sensor 18, respectively. These predetermined levels may be adjusted by circuit-adjusting means 25, schematically indicated in FIG. 1.

The circuit means 20 also provides a dynamic signal to a density indicator 26 and flow indicator 28 such that an exact indication of the density and flow of the mist is indicated respectively. Thus, when the warning signal is activated by either insufficient density or flow, an observer may make an accurate analysis of the problem and adjust the mist supply 12 correspondingly.

The density sensor 16 as shown in FIG. 2 includes a body 30 having a passageway 32 therein adapted to be interposed between portions of the conduit 14 such that the mist from the mist supply 12 flows through the passageway 32 as it travels to the bearings. A lamp 34 is mounted in an opening 36 in the body 30 and supplied with electrical power through the line indicated at 38. Light-restricting means 40 are provided to restrict and direct the light emitted by the bulb 34 through the transparent plate 42 and into the passageway 32. In such a manner, light is emitted into the passageway 32 such that mist will not be allowed to contaminate the interior ducts 44. The ducts 44 are located in the body as hereinafter described for maintaining a blanket of clean air immediately adjacent the light source 34 and light responsive means 54, 72.

Since the intensity of the light given off by the light source 34 may vary, a first sensor means 48 is provided in an aperture 50 which has an axis common to the direction of light emitted by the light source 34 through the light restricting means 40. A portion of the light so emitted, as represented by path 52, passes through the passageway 32 without being reflected by the mist and is sensed by the light-responsive means 54 after passing through the transparent plate 56.

The transparent plate 56 is mounted in the aperture 50 such that sealing means 58 prohibits mist from entering the aperture 50 or the duct 44 and thus prevents contamination of the light-responsive means 54 which would prevent accurately sensing the intensity of the light source 34. The photocell 54 thus provides a signal proportional to the amount of light emitted by the light source 34 and passing through the mist and through the restricting means 40. For example, when the density of the mist increases or the intensity of the light source decreases, the signal from the first sensor means 48 will decrease. This signal is transmitted to the circuit means 20 by connecting lines 60. It should be understood that the first sensor 48 may be positioned in many other various locations that provide a difference between the signal from the first sensor 48 and a second sensor 64 as hereinafter described.

Other portions of the light emitted by the light source 34 through the light-restricting means 40 will be reflected by the mist as representatively shown by path 62. A second sensor means 64 is provided to sense the amount of light so reflected and thus readily determine and provide a signal proportional thereto. Such a second sensor means 64 is positioned such that light reflected by the mist traveling in a common plane to the light emitted from the light source 34, but not along the same axis, will be sensed. For example, in an oil mist system, when the density of the oil 66 in the air 68 increases, the amount of light reflected in path 62 will increase and thus signal from the second sensor means 64 will proportionally increase. The second sensor 64 detects the reflected light in path 62 through a transparent plate 70 by a light-responsive means 72, such as a photocell or phototransistors. The transparent plate 70 is provided with sealing means 74 to prohibit the oil mist from entering the aperture 65 and consequently ducts 44 which would contaminate them and prohibit an accurate signal from being provided to the circuit means 20. The light-responsive means 72 provides a signal proportional to the density of the oil mist to the circuit means 20 through lines 78. It should be apparent that the axes of the sensors 48, 64 and light source 34 are oriented in a radial direction with respect to the aperture 34 to maximize the operational predictability of such a system. In order to maximize the accuracy of this signal from the density sensor 16, the passageway 32 is painted matte black in order to prohibit light from being reflected thereby toward the sensor 64 as a result of reflection from the walls of the passageway 32. It should be apparent that the light-responsive means 54, 72 may consist of any light-responsive device such as a photocell or phototransistor.

Yet another solution to this wall reflection problem is variations in the configurations of the walls. One such possible configuration is representatively shown in a second embodiment of a density sensor in FIG. 3. For ease of description, corresponding numerals will be used for parts common to the designs shown in FIG. 2 and FIG. 3 with the common part shown in FIG. 3 having a suffix "a" after the corresponding numeral.

The density sensor 16a as shown in FIG. 3, includes a light source 34a which may be mounted as described in connection with FIG. 2, a first sensor 48a, and a second sensor 64a. The passageway 32a has flat walls 80 and 82, as shown in FIG. 3, such that light emitted from the light source 34a will not be reflected thereby and thus sensed by the second sensor 64a. It is to be understood these walls 80 and 82 may take on a more complex form than shown in FIG. 3 to prohibit any light from being reflected by the walls defining the passageway 32a. It should also be apparent that these walls 80, 82 defining aperture 32a may be painted in a matte black to further prohibit light from being reflected thereby.

The density sensor 16 and flow sensor 18 are connected to circuit means 20 to activate a warning device 24 in a predetermined manner. FIG. 4 shows the density sensor 16 schematically shown inside the dotted lines indicated 16, connected to the circuit means 20, enclosed by dotted lines generally indicated 20, to provide a signal proportional to the density of the mist contained in the conduit 14 to the circuit means 20. The flow sensor, shown schematically by the dotted lines generally indicated 18, is connected to the circuit means 20 to provide a signal dependent on the flow of the fluid entering the mist supply 12. The circuit means 20 is adapted to supply the warning device 24 with a signal to activate the warning device 24 when the density of the mist or the flow of the fluid drops below a predetermined level as hereinafter described.

The density sensor 16 includes a light source 34 supplied with power through lines 78 partially shown schematically in FIG. 4. Power will be supplied in the art and for ease of description, is not described herein. The first sensor 54, schematically shown in FIG. 4, and the second sensor schematically shown at 72 is provided with a constant voltage supply across points 96 and 98. These light-responsive sensors 54 and 72 allow the current flow to increase as the light sensed thereby increases which will result in a greater potential across points 98 and 100 and 98 and 102 respectively.

Assuming that the intensity of the light source 34 remains constant when the density of the mist increases, the amount of light reflected will increase such that the second sensor 72 will allow more current to flow thus increasing the potential between points 102 and 98. This increase in potential or signal will be received by the amplifier 104. The amplifier 104 also receives a signal in a similar manner form the first sensor 54. The signal from the second sensor 72 will be reduced by the signal from the first sensor 54 by the differential amplifier 104. This differential signal is amplified by the amplifier 104 to provide an amplified differential signal of the density to a biased amplifier 122. It is to be understood that such a differential signal will have a wide range since the differential amplifier amplifies the difference in the signals from the first and second sensors 54 and 72. Such an increased range improves the accuracy of such a monitoring apparatus and allows the output signal therefrom to be more sensitive to changes in density. For example, as the density of mist increases, the amount of light reflected from the mist increases. Hence, the signal from the second sensor 72 increases, and coincident therewith the light intensity which is sensed by the first sensor 54 decreases due to the increase in mist density thereby establishing an enlarged difference between the signals for a given incremental change in mist density. It should be noted that a corresponding drop in the difference between the signals will occur when the density of the mist decreases.

To compensate for the varying intensity of the light source 34 and other system variables, the first sensor 54 will allow the potential between points 100 and 98 to increase as the light intensity increases; correspondingly, the second sensor 72 will allow the potential between points 102 and 98 to increase thus compensating for the intensity change. It should be understood that the first sensor 54 may be positioned in numerous positions to record the light intensity emitted by light 34 so that a resulting signal can be transmitted to the differential amplifier 104 concurrent with the signal being transmitted from the sensor 72 such that a differential signal is provided at the amplifier 104. For example, if the first sensor 54 was positioned to sense the intensity of the light directly and not across the mist, a differential signal would be provided. However, the differential signal range would not be as large as the range established by the relationships illustrated in FIG. 4. Circuit-adjusting means 110 and 112 are provided across points 100 and 98 and 102 and 98, respectively and may be adjusted to initially balance the input to the amplifier 104 such that the amplifier 104 will give no output signal when no mist is present. Thus, the output signal of the amplifier 104 between terminals 114 and 98 will be proportional to the density of the mist in the conduit 14.

A density indicator meter 26 is connected between points 114 and 98 to provide a visible indication of the density of the mist in the conduit 14. Adjusting means 116 is provided between point 100 and 114 to adjust the gain of amplifier 104, thus adjusting the sensitivity thereof. This adjustment will allow an operation to compensate for the different viscosities of the misting material misted.

A circuit-adjusting means 118 is provided between point 114 and the input point 120 of a biased amplifier 122. The biased amplifier receives the amplified differential signal as modified by adjusting means 118 and is biased such that the amplified differential signal is further amplified thereby when it exceeds the biased level. The adjusting means 118 is adjusted so that no output issues from amplifier 122 when the mist density, decreases below a predetermined level. When the mist density, is above the predetermined level, the output of amplifier 122 at point 124 will be above the biased level of the biased amplifier 122. A warning device such as a bell or a light schematically shown at 126, may be attached to point 124 to emit a signal when the density of the mist drops below the predetermined level. Thus, the signal which activates the warning device is the lack of an output signal from biased amplifier 122. It should be noted that a warning system that is triggered by the existence of a signal could also be utilized.

The flow sensor 18 consists of a first temperature-sensing means 90 such as a thermistor, mounted in the fluid supply line 94 and a second temperature-sensing means 92, such as a thermistor, immediately adjacent to the fluid supply line 94 in the ambient air. Thermistor 90 senses the temperature inside the fluid supply line 94 such that when fluid flows, the temperature of the thermistor 90 decreases. Consequently, its resistance changes and creates a signal which may be sensed by the circuit means 20. The thermistor 92 is used to compensate for fluctuations in the ambient air temperature and supply a signal to the circuit means 20 proportional thereto. It should be noted that any conventional flow sensor such as a pressure gauge could be used in the conduit line 14 or fluid supply line 94 to sense the flow of the fluid. In order to provide a signal of the flow of the fluid, a constant potential is applied between points 140 and 142. The potential between points 144 and 142 increases while the potential across points 140 and 144 decreases as the flow increases, since the resistance of thermistor 90 decreases.

When the flow decreases the resistance of the thermistor 90 increases and the potential between points 144 and 142 decreases while the potential between points 144 and 140 increases correspondingly. In a similar fashion, the voltage across points 145 and 142 decreases as the ambient air temperature increases due to the increase in resistance of the thermistor 92 and results in a voltage potential increase between point 140 and 145.

Thus, it may be seen that in operation as the flow increases, the temperature of thermistor 90 decreases creating a corresponding voltage increase between points 144 and 142. In a corresponding fashion, when the ambient temperature decreases, the thermistor 92 will create a corresponding voltage decrease between points 142 and 145.

The signal created by the thermistor 90 across points 144 and 142 and the ambient temperature-compensating signal from thermistor 92 across points 145 and 142 is received by differential amplifier 148. The amplifier 148 operates in a similar manner as hereinabove described in connection with amplifier 104 and compensates for the ambient air temperature with the signal from thermistor 92 and provides a signal at point 150 which is dependent on the flow of the fluid in the fluid supply line 94. This ambient temperature compensation is provided by the amplifier 148 by amplifying the difference between the signal from the compensating sensor means 92 and the signal from the flow-sensor means 90.

Circuit-adjusting means 152 and 154 are provided to adjust the inputs from points 144 and 145 respectively to the amplifier 148 such that amplifier 148 is turned off when no fluid is flowing or the fluid flow has dropped below a predetermined level. Thus the circuit-adjusting means 152, 154 may be used to provide a predetermined level above which a signal will be provided to indicate that fluid is flowing. A flow indicator meter 28 is provided and attached to the circuit means 20 across points 150 and 142. The flow indicator meter 28 thus provides a visible indication of the flow of the fluid. A circuit-adjusting means 156 is provided across points 142 and 150 to provide and AND-gate 160 with a signal at point 162 when fluid is flowing through the fluid supply line 94. The AND gate is also connected to point 124 and receives a signal therefrom as hereinabove described.

When the AND gate receives a signal from both the density sensor 16 and flow sensor 18, the warning device 24 is activated. But when either the density sensor 16 or the flow sensor 18 does not provide a signal to the AND gate the AND gate provides a signal to the warning device thus activating the warning device to alert the operator of the malfunction. For example, when the flow of the fluid drops below a predetermined level, there will be no potential at point 162 and the warning device 24 will be activated by a signal provided thereto by the AND gate. On the other hand, when the density of the mist in the conduit 14 drops below a predetermined level, there will be no signal at point 124 and the warning device 24 will be activated by a signal provided thereto by the AND gate. Thus, when the density level and the flow indication are at the proper level, inputs are furnished to the AND-gate 160 and the warning device 24 is not activated. But when either signal from point 124 and 162, as hereinabove described drops below the predetermined level, and the AND-gate will switch and activate the warning device 24. When the warning device 24 is activated, an observer may determine the specific problem area by observing the mist density meter 26 and the flow indicator meter 28. It should also be noted that the mist-warning device 126 will be actuated when the mist density drops below a predetermined level to provide an additional feature to assure proper lubrication of the aforementioned bearings.

It should be understood that the circuit means 20 could be attached to control device which would automatically compensate for the varying conditions of the mist system above described. It should be further understood that such a control device could be used in conjunction with the warning device 24 as an additional safety precaution.

It should be apparent from the above that the present invention provides a monitoring apparatus for monitoring the presence of a material carried by a fluid in a conduit and the flow of the fluid, comprising a circuit means adapted to receive a signal from a density sensor and a flow sensor which is dependent on the density and flow, respectively. The circuit means is adapted to activate a warning device when the flow or the density drops below a predetermined level.

Having described my invention I claim:

1. An apparatus for monitoring the presence of a material carried by a fluid in a conduit and the flow of said fluid comprising circuit means for indicating the density of the material carried by the fluid and the flow of the fluid, means for sensing the density of the material carried by said fluid and operable to provide a first input signal to said circuit means dependent on said density of the material carried by said flow of said fluid and operable to provide a second input signal to said circuit means dependent on said floe of fluid said circuit means including means responsive to said first and second signals for providing an output signal when said second signal from said means for sensing said flow indicates a flow below a first predetermined level or when said first signal from said means for sensing said density of the material drops below a second predetermined level or when said first signal from said means for sensing said density of the material drops below a second predetermined level and warning means responsive to said output signal for providing a warning signal to thereby indicate when the density of the material carried by the fluid is below said second predetermined level or the flow of the fluid is below said first predetermined level.

2. An apparatus for monitoring the presence of a material carried by a fluid in a conduit and the flow of said fluid as defined in claim 1 wherein said circuit means further includes first circuittadjusting means for varying said first predetermined level.

3. An apparatus for monitoring the presence of a material carried by a fluid in a conduit and the flow of said fluid as defined in claim 2 wherein said circuit means further includes second circuit-adjusting means for varying said second predetermined level.

4. An apparatus for monitoring the presence of a material carried by a fluid in a conduit and the flow of said fluid as defined in claim 1 wherein said means for sensing said density of the material carried by said fluid includes a light source adapted to provide said conduit with light, first sensor means for detecting light along a first path and providing a signal proportional to the intensity of light in said one path, second sensor means for detecting light along a second path and providing a signal proportional to the intensity of light in said second path, the first and second paths being such that said signal from said second sensor means increases with respect to said signal from said first sensor means as the density of the material carried by said fluid increases, and comparator means for comparing said signal from said first sensor means with the signal from said second sensor means, said comparator means providing said first input signal dependent on said density of the material carried by said fluid.

5. An apparatus for monitoring the presence of a material carried by a fluid in a conduit and the flow of said fluid as defined in claim 4 wherein said second sensor means detects said light in said second path by sensing the light provided by said light source which is reflected by said material.

6. An apparatus for monitoring the presence of a material carried by a fluid in a conduit and the flow of said fluid as defined in claim 5 wherein said means for sensing the flow of said fluid includes flow sensor means adapted to determine the flow of said fluid and operable to provide a signal dependent thereon, compensating sensor means for providing a signal for compensating for system variables, and means for comparing said signals from said flow sensor means and said compensating sensor means and operable to provide said second input signal dependent on said flow of fluid.

7. An apparatus for monitoring the presence of a material carried by a fluid in a conduit and the flow of said fluid as defined in claim 6 wherein said means for comparing said signals from said flow sensor means and said compensating sensor means is operable to determine the algebraic difference between said signals from said flow and compensating sensor means, said means for comparing said signals from said flow sensor means and said compensating sensor means directing said second input signal to said means responsive to said first and second signals to provide said output signal when said difference between said signals from said flow and compensating sensor means is of a predetermined magnitude.

8. An apparatus for monitoring the presence of a material carried by a fluid in a conduit and the flow of said fluid as defined in claim 6 wherein said flow-sensor means includes a temperature changes created by the flow of said fluid and said compensating sensor means including a temperature sensor for sensing the ambient air temperature of the air surrounding said conduit.

9. An apparatus for monitoring the presence of a material carried by a fluid in a conduit and the flow of said fluid as defined in claim 1 including a density meter connected to said means for sensing the density of the material and responsive to said first input signal and operable to give a visible indication of said density of the material carried by the fluid.

10. An apparatus for monitoring the presence of a material carried by a fluid in a conduit and the flow of said fluid as defined in claim 9 including a flow indicator connected to said means for sensing said flow of fluid and responsive to said second signal and operable to provide a visible indication of the flow of the fluid.

11. An apparatus for monitoring the presence of a material carried by a fluid in a conduit and the flow of said fluid as defined in claim 1 further including means responsive to said first input signal, a density-warning device connected to said means responsive to said first input signal such that said density-warning device will be activated in response to said first input signal indicating said density of the material in said fluid is below said second predetermined level.

12. An apparatus for monitoring the presence of a material carried by fluid in a conduit as defined in claim 1 wherein said means for sensing the density of the material includes light source means for directing light into said conduit, first sensor means for detecting said light and providing a signal proportional thereto, second sensor means for detecting the amount of said light reflected by the material carried by said fluid and providing a signal proportional thereto, and comparator means for subtracting said signal from said first sensor means from said signal from said second sensor means and providing said first input signal, said means responsive to said first and second input signals providing said output signal when said first input signal drops below a predetermined level.

13. An apparatus for monitoring the presence of a material carried by a fluid in a conduit as defined in claim 12 wherein said first sensor means detects light along one path and provides said comparator means with a signal proportional thereto, said second sensor means detects light along a different path and provides said comparator means with a signal proportional thereto, said paths being such that said signal from said second sensor increases with respect to said signal from said first sensor as the density of the material carried by said fluid increases.

14. An apparatus for monitoring the presence of a material carried by a fluid in a conduit as defined in claim 13 wherein said first sensor means is positioned along an axis common to the axis of said light.

15. An apparatus for monitoring the presence of a material carried by a fluid in a conduit defined in claim 14 wherein said second sensor means is positioned along an axis which is at an angle with respect to the axis of said light such that the density of the material in said fluid is detected thereby.

16. An apparatus for monitoring the density of a material carried by a fluid in a conduit as defined in claim 15 wherein said first sensor provides said signal to said comparator means for compensating for the intensity of said light such that said first signal is not affected by fluctuations in the intensity of said light source.

17. An apparatus for monitoring the presence of a material carried by a fluid in a conduit and the flow of said fluid comprising circuit means having first amplifying means, light source means adapted to provide said conduit with at least one ray of light in a substantially radial direction with respect to said conduit, first sensor means for detecting said light and providing said first amplifying means with a signal proportional thereto, second sensor means for detecting said light reflected by said material carried by said fluid and providing said first amplifying means with a signal proportional thereto, said first amplifying means adapted to provide a signal proportional to said signal from said first sensor when subtracted from said signal from said second sensor means, flow-sensing means adapted to detect the rate of flow of said fluid to provide a signal dependent on the rate of flow of said fluid, and means responsive to said signals from said first amplifying means and said flow-sensing means to provide an output signal when said density or said flow drops below a predetermined level.

18. An apparatus for monitoring the presence of a material carried by a fluid in a conduit as defined in claim 17 wherein said circuit means includes a circuit-adjusting means for varying when said density drops below said predetermined level.

* * * * *